US007654173B2

(12) United States Patent
Wang et al.

(10) Patent No.: US 7,654,173 B2
(45) Date of Patent: Feb. 2, 2010

(54) MOUNTING DEVICE FOR EFFICIENTLY MOUNTING BUTTONS

(75) Inventors: Zhi-Wei Wang, Shenzhen (CN); Min Guo, Shenzhen (CN); Chun-Nan Ou, Tu-Cheng, Taipei Hsien (TW); Qi-Ke Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 318 days.

(21) Appl. No.: 11/611,155

(22) Filed: Dec. 15, 2006

(65) Prior Publication Data

US 2008/0047405 A1 Feb. 28, 2008

(30) Foreign Application Priority Data

Aug. 25, 2006 (CN) ........................ 2006 2 0017924

(51) Int. Cl.
*B23P 11/00* (2006.01)

(52) U.S. Cl. ............................ 79/4; 29/243.529; 83/13

(58) Field of Classification Search ....................... 29/4, 29/34 R, 243.518, 243.529, 704–710, 743; 83/13, 669, 684, 19, 55, 862; 79/1–5; 72/327; 264/153, 163
See application file for complete search history.

(56) References Cited

U.S. PATENT DOCUMENTS

| | | | | |
|---|---|---|---|---|
| 3,643,530 | A * | 2/1972 | Roebuck | 79/5 |
| 3,863,527 | A * | 2/1975 | Berning | 79/5 |
| 5,881,611 | A * | 3/1999 | Wagner et al. | 79/1 |
| 6,038,944 | A * | 3/2000 | Braunberger | 29/243.529 |
| 6,938,518 | B1 * | 9/2005 | Braunberger | 79/1 |
| 2008/0047405 | A1 * | 2/2008 | Wang et al. | 83/13 |

FOREIGN PATENT DOCUMENTS

CN 2214281 Y 12/1995

* cited by examiner

*Primary Examiner*—Minh Trinh
(74) *Attorney, Agent, or Firm*—Wei Te Chung

(57) ABSTRACT

A mounting device, for mounting a plurality of buttons on a product, includes a supporting member, a punching member, and a driving member The supporting member includes a supporting panel, a plurality of holding portions fixed on the supporting panel for supporting the product, a molding board having a plurality of molding holes a platform, and a base fixed on the platform for supporting the molding board. The punching member includes a retaining member positioned above the supporting member, and a plurality of cutters fixed to the retaining member The cutters cut the buttons off a button assembly, and couple to a vacuum generator for creating suction to hold the buttons. The driving member drives the punching member to mount the buttons on the product.

13 Claims, 7 Drawing Sheets

MOUNTING DEVICE FOR EFFICIENTLY MOUNTING BUTTONS

BACKGROUND OF THE INVENTION

1. Field of the Invention

The present invention pertains to a mounting device, and particularly to a mounting device used for buttons.

2. Description of Related Art

Electrical products usually comprise a plurality of buttons on a shell thereof. And usually, the buttons are mounted one by one on the product manually. However, when a product having a large number of buttons is assembled, efficiency of manual assembly is too low.

Therefore, a need exists in the industry to overcome the aforementioned deficiencies and inadequacies.

SUMMARY OF THE INVENTION

In an exemplary embodiment, a mounting device, used for mounting a plurality of buttons on a shell of a product, includes a supporting member, a punching member, and a driving member for driving the punching member. The supporting member includes a platform, a base fixed on the platform, a supporting panel, a plurality of holding portions fixed on the supporting panel for supporting the shell, and a molding board having a plurality of molding holes corresponding to button holes in the shell of the product. The supporting panel is fixed on the platform, and the molding board is fixed on the base. The punching member includes a retaining member positioned above the supporting member, and a plurality of cutters fixed on the retaining member for cutting the buttons off a button assembly. Each of the cutters includes an axial through hole coupled to a vacuum generator. And when the buttons are cut off the button assembly, the buttons are held to the cutters by suction created by the vacuum generator.

Other advantages and novel features will become more apparent from the following detailed description when taken in conjunction with the accompanying drawings, in which:

DETAILED DESCRIPTION OF THE INVENTION

Figure 1:
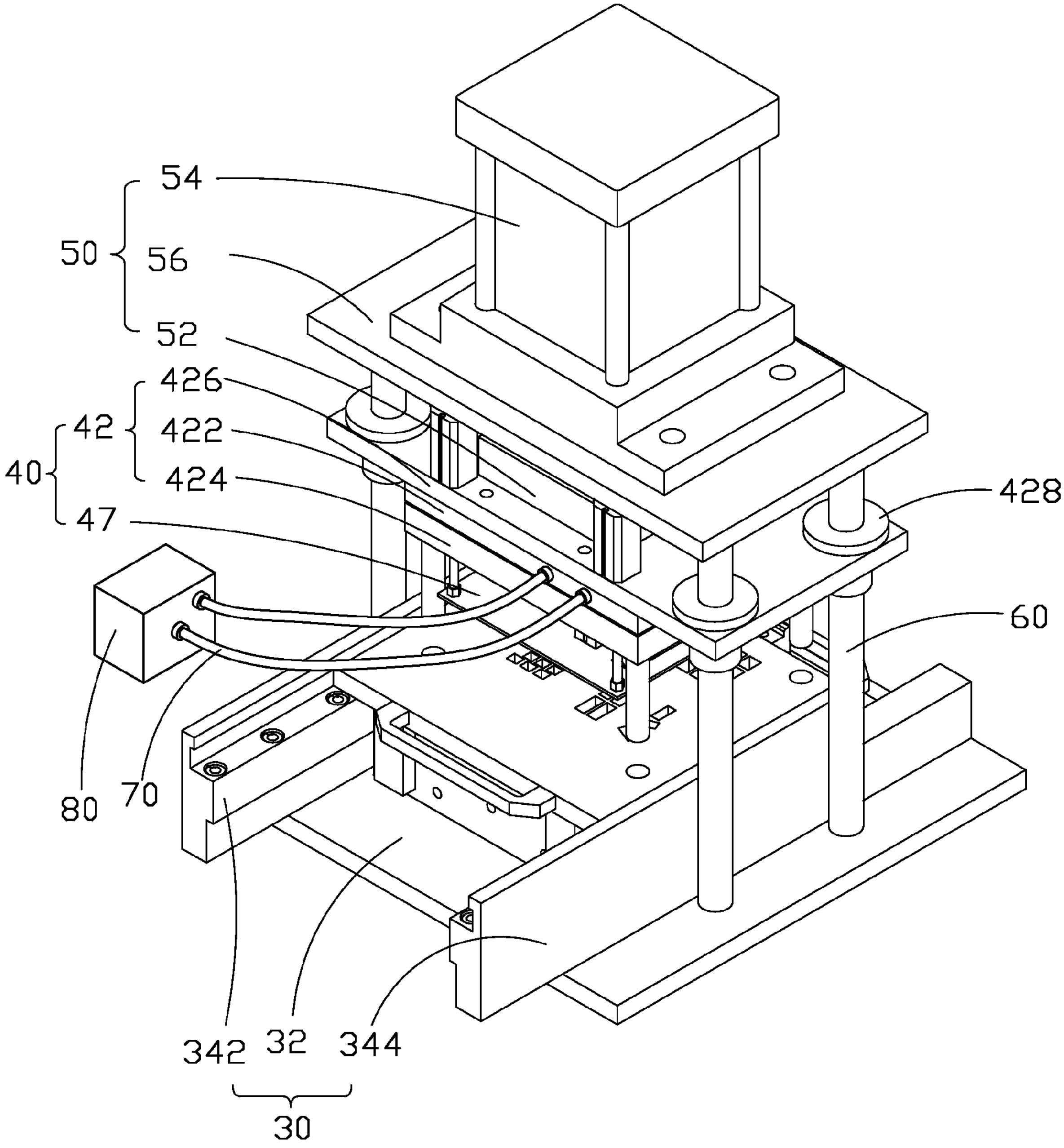
FIG. 1 is an assembled view of an mounting device of the present invention, the mounting device includes a supporting member, a punching member, and a driving member.

Referring to FIG. 1, a mounting device 100 of the present invention of an exemplary embodiment is shown. The mounting device 100 comprises a supporting member 30 used for supporting a shell of a product (not shown) and a frame-formed button assembly (not shown), a punching member 40 used for cutting buttons off the button assembly and mounting the buttons on the shell of the product, and a driving member 50 used for driving the punching member 40. The button assembly comprises connections formed between the buttons of the button assembly.

Figure 2:
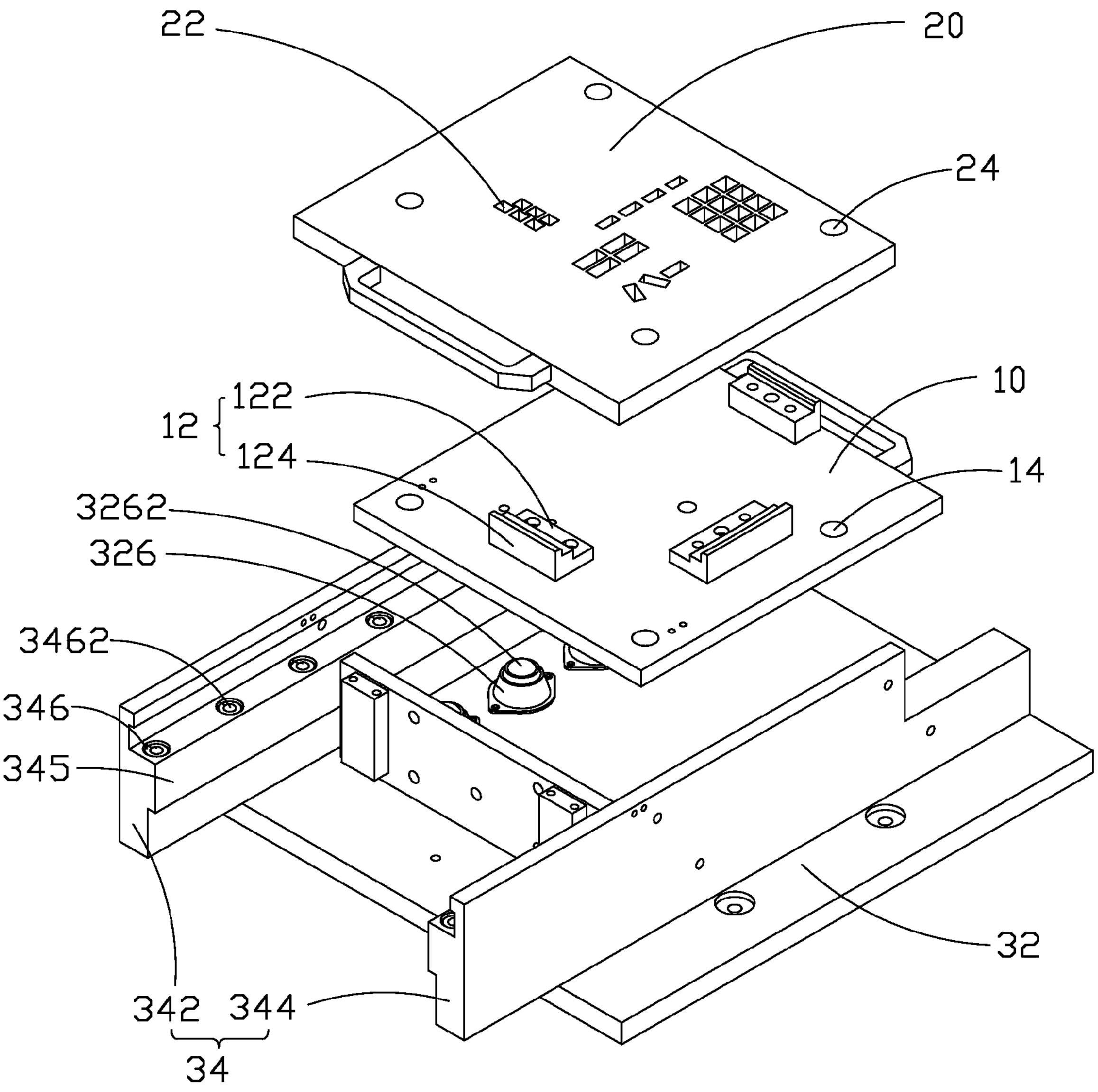
FIG. 2 is an exploded, perspective view of the supporting member of FIG. 1.

Referring also to FIG. 2, the supporting member 30 comprises a platform 32, a base 34, a rectangular supporting panel 10, and a rectangular molding board 20. The base 34 comprises a first-supporting wall 342 and a second-supporting wall 344 both fixed on the platform 32. The first-supporting wall 342 is parallel to the second-supporting wall 344. The first-supporting wall 342 and the second-supporting wall 344 respectively comprise a projecting portion 345 protruding toward each other. Each of the two projecting portions 345 comprises a plurality of recessed portions 346 arranged equidistantly along an upper surface thereof, and a plurality of balls 3462 rollably received in the recessed portions 346 for supporting the molding board 20. Two rows of globular portions 326 having a depressed portion thereon are formed on a surface of the platform 32 between the first-supporting wall 342 and the second-supporting wall 344. And a plurality of balls 3262 is rollably received in the depressed portion of the globular portions 326, for supporting the supporting panel 10. The two rows of globular portions 326 are formed respectively adjacent to the first-supporting wall 342 and the second-supporting wall 344.

The supporting member 30 further comprises a plurality of holding portions 12 fixed on a surface of the supporting panel 10, to fix the shell of the product on the supporting panel 10. Each of the holding portions 12 comprises a bottom portion 122 for supporting the shell of the product, and a blocking wall 124 integrally formed with the bottom portion to prevent the shell of the product from sliding out of place. The supporting panel 10 further comprises a plurality of positioning holes 14 arranged around the plurality of the holding portions 12.

The molding board 20 comprises a plurality of molding holes 22 corresponding to button holes of the shell of the product, and a plurality of positioning holes 24 corresponding to the positioning holes 14 of the supporting panel 10.

Figure 3:
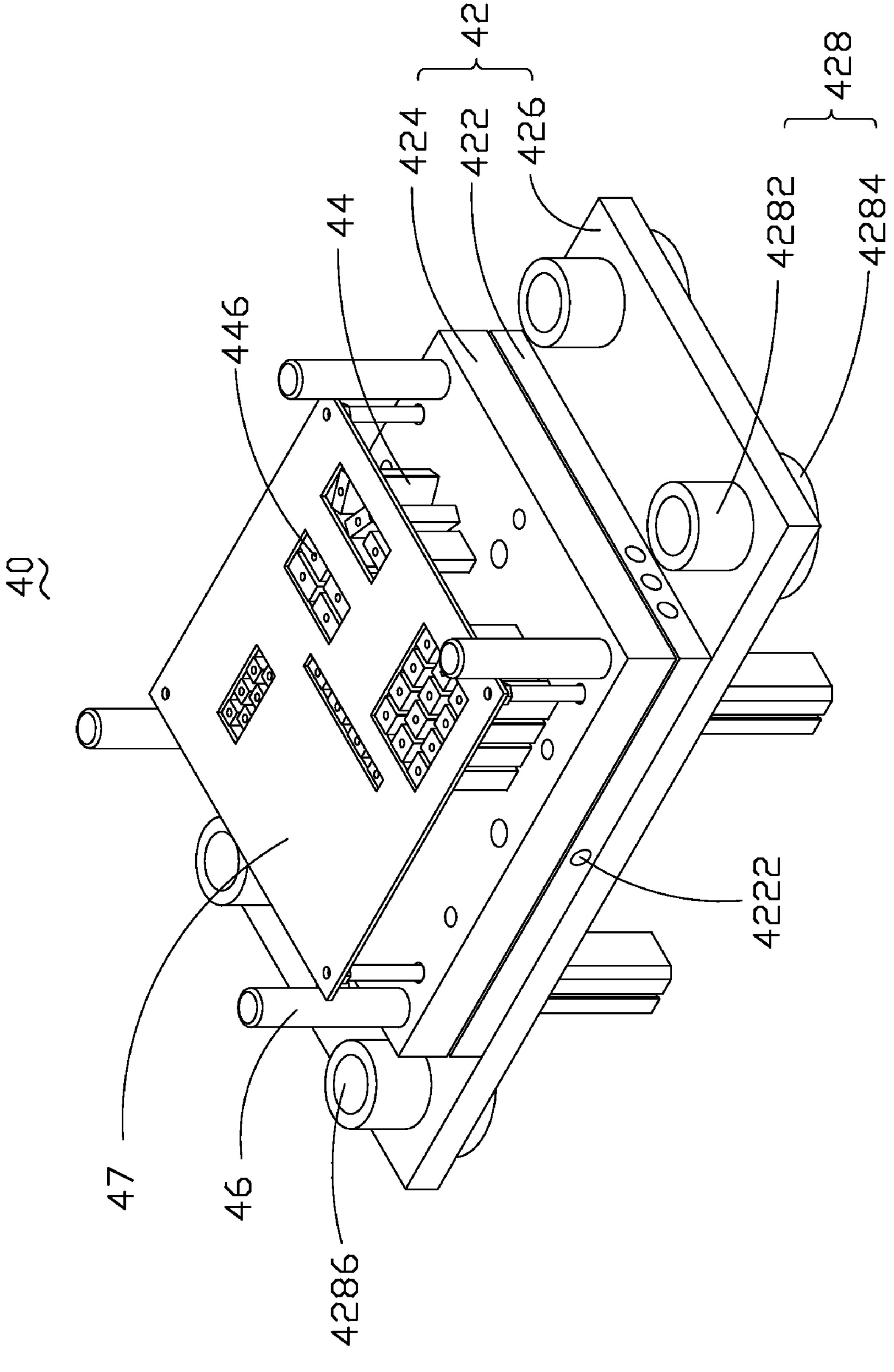
FIG. 3 is an inverted assembled view of the punching member of FIG. 1, the punching member includes a second fixing portion and a first fixing portion.

Referring to FIG. 2 and FIG. 3, the punching member 40 is positioned above the supporting member 30, and comprises a retaining member 42, and a plurality of cutters 44 fixed to the retaining member 42. The cutters 44 protrude toward the supporting member 30 and correspondingly to the molding holes 22 of the molding board 20. The retaining member 42 comprises a rectangular guiding board 426, a first fixing portion 422 fixed on a lower surface of the guiding board 426, and a second fixing portion 424 fixed to the first fixing portion 422.

Figure 4:
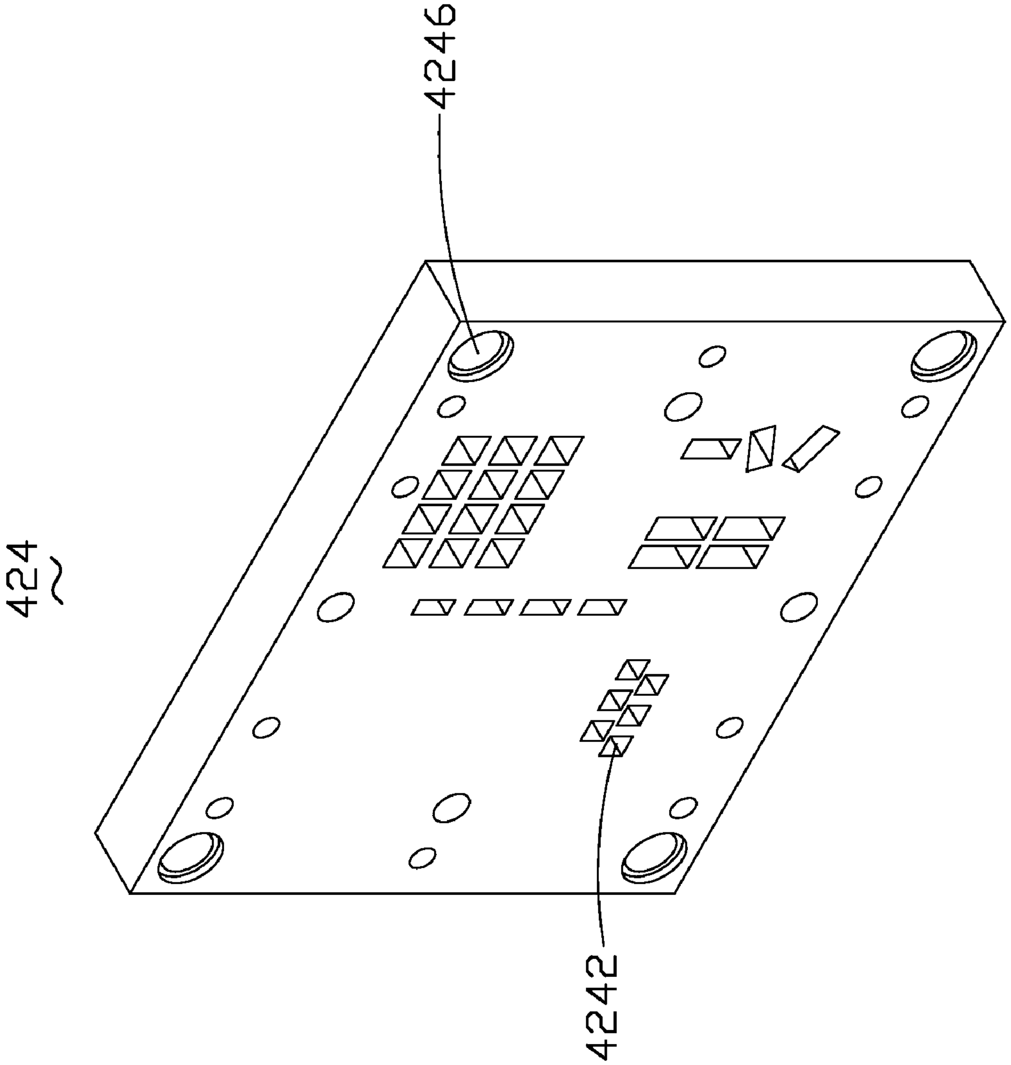
FIG. 4 is a perspective view of the second fixing portion of the punching member of FIG. 3.

Referring to FIG. 2 and FIG. 4, the second fixing portion 424 comprises a plurality of guiding holes 4242 corresponding to the molding holes 22, and a plurality of through holes 4246 corresponding to the positioning holes 24.

Figure 5:
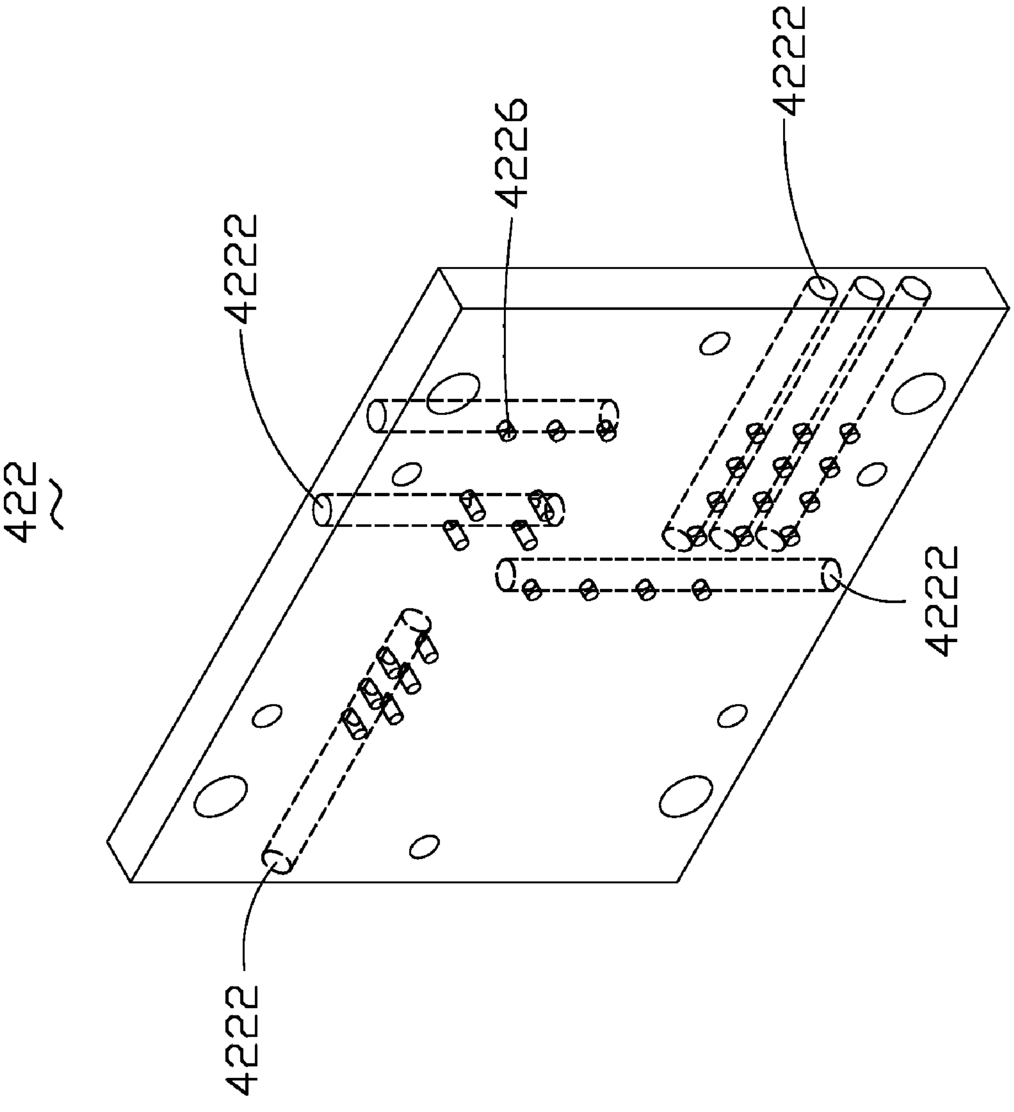
FIG. 5 is a perspective view of the first fixing portion of the punching member of FIG. 3.

Referring to FIG. 1 and FIG. 5, the first fixing portion 422 defines a plurality of air holes 4222 in sides thereof, and another plurality of air holes 4226 at a bottom thereof and corresponding to the guide holes 4242. The air holes 4226 communicate with the air holes 4222. The punching member 40 further comprises a plurality of pipes 70, and both ends of each of the pipes are respectively coupled to the air holes 4222 and a vacuum generator 80.

Figure 6:
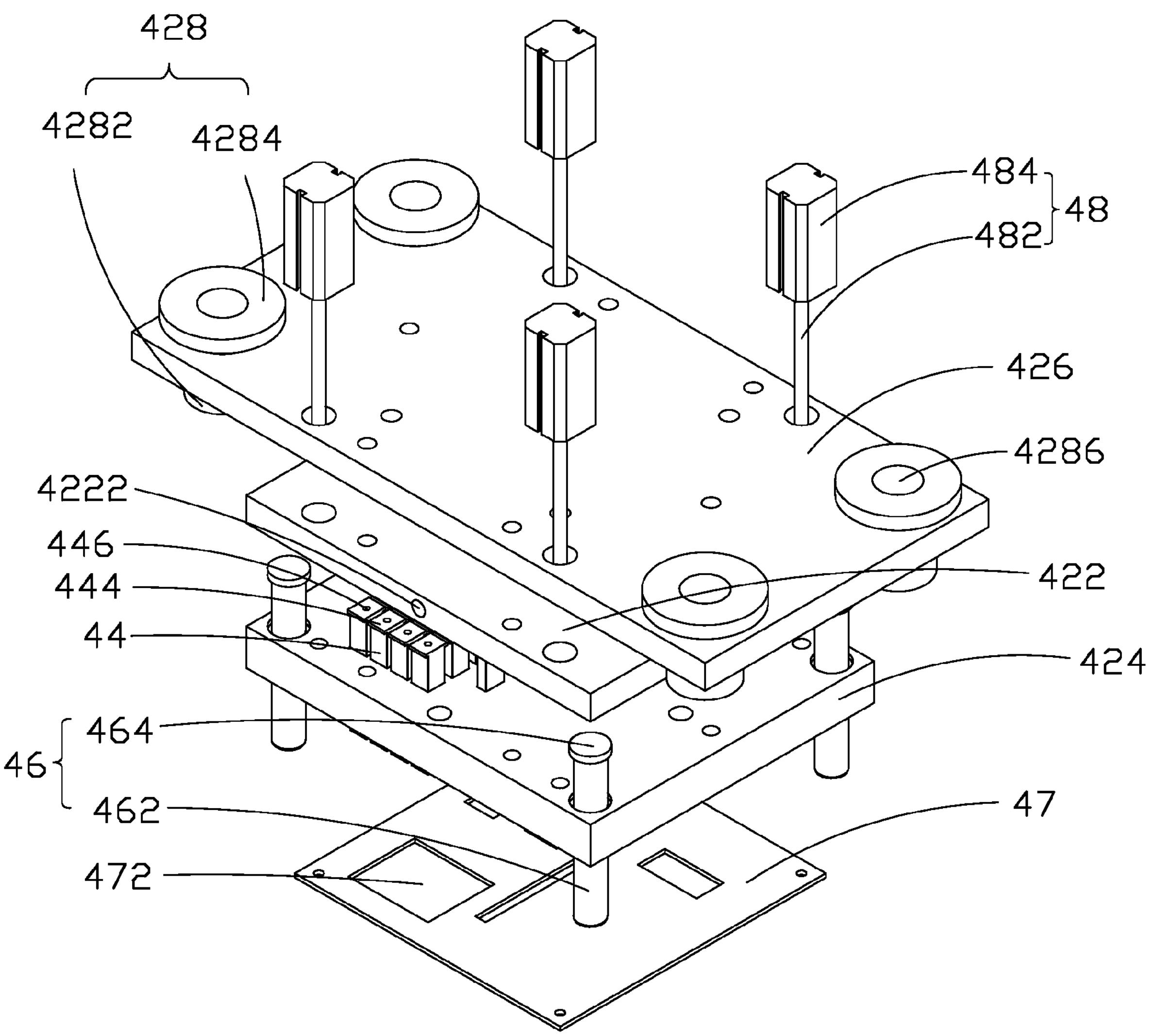
FIG. 6 is an exploded view of the punching member of FIG. 1.

Referring to FIG. 4 and FIG. 6, each of the cutters 44 comprises a flange 444 formed at an end thereof. The cutters 44 extend through the guiding holes 4242 of the second fixing portion 424, with the flange 444 being fixed between the second fixing portion 424 and the first fixing portion 422.

Each of the cutters 44 further comprises an axial through hole 446 communicating with the corresponding air hole 4226 covered by the flange 444 hereof. That is, the through holes 446 are coupled to the vacuum generator 80 through the air hole 4226 and the air hole 4222.

Referring to FIG. 2 and FIG. 3, the punching member 40 further comprises four bushes 428 respectively fixed in four corners of the guiding board 426. Each of the bushes 428 comprises a circular flange 4284 located on an upper surface of the guiding board 426, and a column-shaped main body 4282 protruding from the flange 4284 and extending through the guiding board 426. Each of the bushes 428 further defines an axial through hole 4286.

Referring to FIG. 1 and FIG. 6, the punching member 40 further comprises a plurality of positioning poles 46 each comprising a flange 464 formed at an end thereof. The positioning poles 46 extend through the through holes 4246 with the flanges 464 fixed between the second fixing portion 424 and the first fixing portion 422. In the exemplary embodiment, the positioning poles 46 are longer than the cutters 44.

Referring to FIG. 6, the punching member 40 further comprises four resilient portions 48, and a rectangular baffle 47 defining a plurality of openings 472 corresponding to the plurality of the cutters 44. Each of the resilient portions 48 comprises a main body 484 fixed on an upper surface of the guiding board 426, and a pole 482 extending through the guiding board 426, the first fixing portion 422 and the second fixing portion 424. The poles 482 are respectively fixed to four corners of the baffle 47. Within each main body 484 is a resilient member, for resisting against the poles 482. In the exemplary embodiment, the resilient members are air springs, and when the mounting device 100 is in a standby state, a lower surface of the baffle 47 is not higher than a lower surface of the cutters 44.

Figure 7:
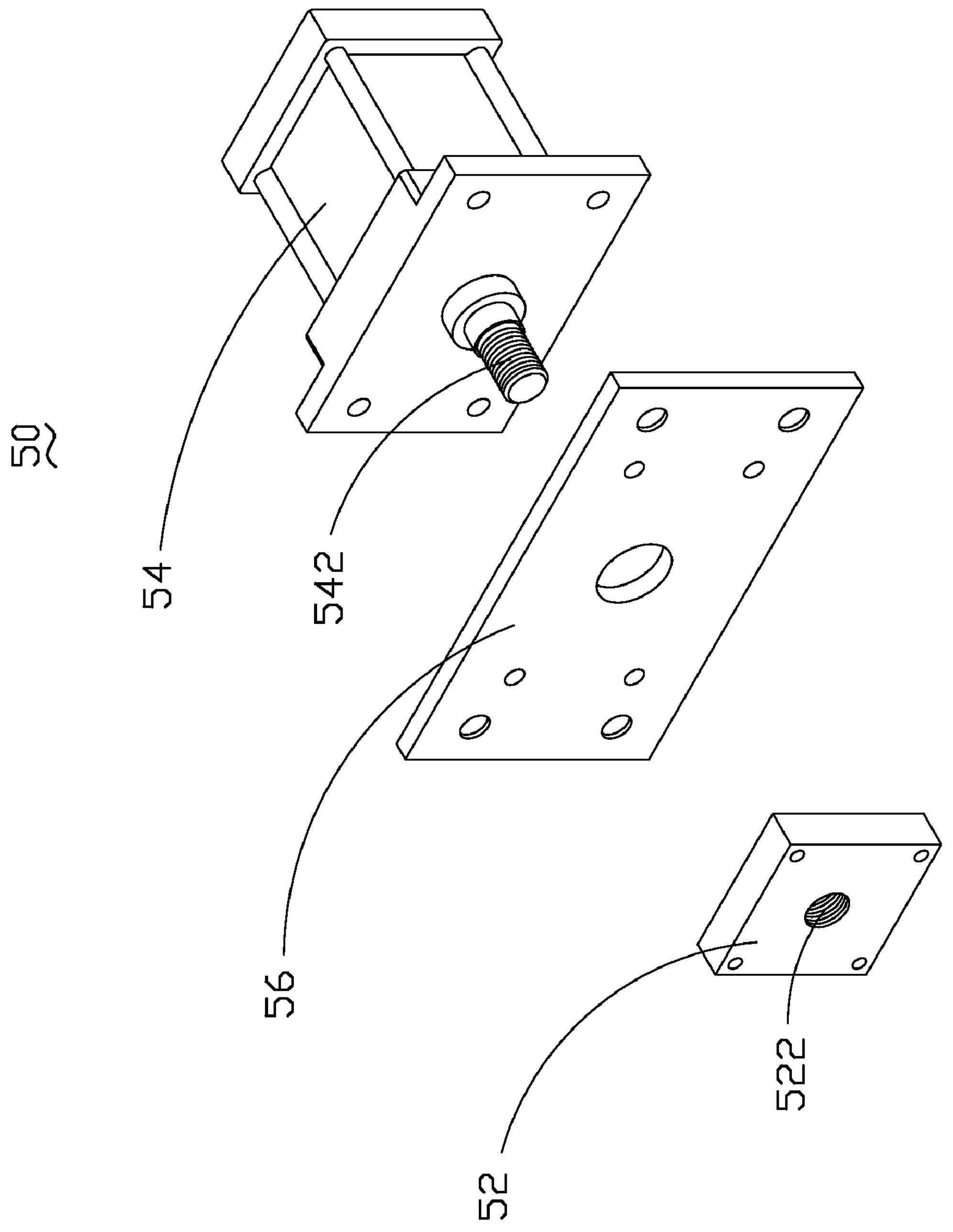
FIG. 7 is an exploded view of the driving member of FIG. 1.

Referring to FIG. 1 and FIG. 7, the driving member 50 comprises a pressing block 52 fixed on the guiding board 426 of the punching member 40, a supporting board 56, and a cylinder 54 for pushing the pressing block 52 downwardly to drive the punching member 40. The pressing block 52 defines a threaded hole 522 therein. The cylinder 54 comprises a spindle 542 protruding from the cylinder 54, extending through the supporting board 56, and fixed to the pressing block 52.

Referring to FIG. 1 and FIG. 6, a plurality of supporting poles 60 passes through the bushes 428, with ends of each of the supporting poles 60 respectively fixed to the supporting board 56 and the platform 32, for supporting the driving member 50 and guiding the punching member 40 to slide between the driving member 50 and the supporting member 30.

Referring to FIG. 1, in assembly, the supporting poles 60 are fixed on the platform 32 of the supporting member 30. The punching member 40 is positioned above the supporting member 30 with the four bushes 428 receiving the supporting poles 60 therein. And the driving member 50 is positioned above the punching member 40 with the supporting board 56 fixed on upper ends of the supporting poles 60, and the spindle 542 is fixed to the pressing block 52.

Before use, the shell of the product is positioned on the holding portion 12 of the supporting panel 10. The bottom portions 122 of the holding portion 12 support the bottom of the shell, and the blocking walls 124 prevent the shell from sliding out of position. The frame-formed button assembly having a plurality of buttons thereon is positioned on the molding board 20, with the buttons respectively being received in the corresponding molding holes 22.

In use, the cylinder 54 pushes the punching member 40 downwardly, the button assembly is pressed against the molding board 20 by the baffle 47. The cutters 44 pass through the opening 472 of the baffles 47, and cut the buttons received in the molding holes 22 off the button assembly. Because of suction of the vacuum generator 80, the buttons are held to the cutters 44 until the buttons are received in the corresponding button holes and mounted to the shell of the product. And when the buttons are mounted on the shell of the product, the cylinder 54 pulls the punching member 40 up. During the rising process of the cutters 44, the baffle 47 still presses the remaining portion of the button assembly against the molding board 20 to prevent the remaining portion of the button assembly rising along with the cutters 44.

Because the buttons are formed in the button assembly in a predetermined arrangement, the buttons will be precisely mounted to the shell of the product.

If the molding board 20 or the supporting panel 10 are not correctly positioned on the base 34, the positioning poles 46 cannot pass through the positioning holes 24 or the positioning holes 14, and the punching member 40 will be stopped by the positioning poles 46 abutting against the molding board 20 or the supporting panel 10, therefore the cutters 44 are prevented from impacting against the molding board 20, and the buttons are prevented from being mis-mounted on the shell of the product.

During the mounting process, the buttons are held to the cutters 44 by suction created by the vacuum generator 80, and are therefore prevented from being accidentally dropped from the cutters 44.

Because the cutters 44 can machine a plurality of buttons synchronously, efficiency in mounting buttons is increased.

While exemplary embodiments have been described above, it should be understood that they have been presented by way of example only and not by way of limitation. Thus the breadth and scope of the present invention should not be limited by the above-described exemplary embodiment, but should be defined only in accordance with the following claims and their equivalents.

What is claimed is:

1. A mounting device, used for mounting a plurality of buttons on a shell of a product, comprising:

a supporting member, comprising:

a platform;

a base, fixed on the platform;

a molding board, fixed on the base, and comprising a plurality of molding holes;

a supporting panel, fixed on the platform and under the molding board; and a plurality of holding portions fixed on the supporting panel for supporting the shell;

a punching member, comprising a retaining member positioned above the supporting member, and a plurality of cutters for cutting the buttons off a button assembly, the cutters fixed to the retaining member, and each of the cutters comprising an axial through hole coupled to a vacuum generator; and a driving member, used for driving the punching member;

wherein the buttons are held to the cutters by suction created by the vacuum generator when the buttons are cut off the button assembly.

2. The mounting device as claimed in claim 1, wherein the retaining member further comprises a plurality of air holes corresponding to the axial through holes, and the axial through holes are coupled to the vacuum generator through the air holes.

3. The mounting device as claimed in claim 2, wherein the retaining member comprises a first fixing portion where the air holes are defined, and a second fixing portion fixed to the first fixing portion.

4. The mounting device as claimed in claim 3, wherein the cutters extend through the second fixing portion, and each of the cutters comprises a flange fixed between the second fixing portion and the first fixing portion, with the through holes communicating with the corresponding air holes covered by the flanges.

5. The mounting device as claimed in claim 1, wherein the base comprises a pair of supporting walls fixed on the platform, for supporting the molding board.

6. The mounting device as claimed in claim 5, wherein each of the supporting walls comprises a projecting portion projecting from a side thereof.

7. The mounting device as claimed in claim 1, wherein the punching member further comprises a plurality of positioning poles, and the molding board further comprises a plurality of positioning holes corresponding to the positioning poles.

8. The mounting device as claimed in claim 7, wherein the supporting panel further comprises a plurality of positioning holes corresponding to the positioning poles.

9. The mounting device as claimed in claim 1, further comprises a baffle positioned under the retaining member, and a plurality of resilient portions, two ends of each of the resilient portions respectively fixed to the retaining member and the baffle.

10. The mounting device as claimed in claim 9, wherein the resilient portions comprise air springs.

11. The mounting device as claimed in claim 1, wherein the driving member comprises a cylinder for driving the punching member.

12. The mounting device as claimed in claim 1, further comprises a plurality of supporting poles fixed on the platform, and the driving member is fixed on the supporting poles.

13. The mounting device as claimed in claim 12, wherein the punching member further comprises a guiding board, and a plurality of bushes fixed in the guiding board and receiving the supporting poles therein, the first fixing portion is fixed on a lower surface of the guiding board.

* * * * *

UNITED STATES PATENT AND TRADEMARK OFFICE

CERTIFICATE OF CORRECTION

PATENT NO. : 7,654,173 B2 Page 1 of 1
APPLICATION NO. : 11/611155
DATED : February 2, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 367 days.

Signed and Sealed this

Twenty-third Day of November, 2010

David J. Kappos
*Director of the United States Patent and Trademark Office*